US010951125B2

(12) United States Patent
Tobayashi et al.

(10) Patent No.: US 10,951,125 B2
(45) Date of Patent: Mar. 16, 2021

(54) SUPRESSION OF CROSS CURRENT IN A PLURAL CONVERTER SYSTEM (71) Applicant: Toshiba Mitsubishi-Electric Industrial Systems Corporation, Chuo-ku (JP)

(72) Inventors: Shunsuke Tobayashi, Tokyo (JP); Hiromitsu Suzuki, Tokyo (JP)

(73) Assignee: Toshiba Mitsubishi-Electric Industrial Systems Corporation, Chuo-ku (JP)

( * ) Notice: Subject to any disclaimer, the term of this patent is extended or adjusted under 35 U.S.C. 154(b) by 0 days.

(21) Appl. No.: 15/930,801

(22) Filed: May 13, 2020

(65) Prior Publication Data

US 2020/0321888 A1   Oct. 8, 2020

Related U.S. Application Data

(63) Continuation of application No. PCT/JP2017/041104, filed on Nov. 15, 2017.

(51) Int. Cl.
*H02M 5/40*        (2006.01)
*H02J 3/18*        (2006.01)
*H02M 1/42*        (2007.01)
*H02M 7/493*       (2007.01)
(Continued)

(52) U.S. Cl.
CPC .................. *H02M 5/40* (2013.01); *H02J 3/18* (2013.01); *H02M 1/4208* (2013.01); *H02M 7/493* (2013.01); *H02P 27/08* (2013.01); *H02M 2001/0009* (2013.01); *H02M 2001/0025* (2013.01)

(58) Field of Classification Search
CPC ............ H02M 5/40; H02M 5/42; H02M 5/44; H02M 7/23; H02M 2001/0025; H02M 2001/0009; H02M 7/493; H02M 2001/123; H02M 7/12; H02M 2007/4822; H02J 3/18; H02P 27/08
USPC ............................................... 363/35, 71, 72
See application file for complete search history.

(56) References Cited

U.S. PATENT DOCUMENTS 5,446,645 A *  8/1995  Shirahama ............ H02M 7/493
                                                363/71
2009/0003020 A1*  1/2009  Zhang ..................... H02M 1/32
                                                363/65
(Continued)

FOREIGN PATENT DOCUMENTS

JP       2002-291255 A    10/2002
JP       2012-244674 A    12/2012
JP       2017-022815 A     1/2017

OTHER PUBLICATIONS

International Search Report dated Jan. 23, 2018 in PCT/JP2017/041104 filed on Nov. 15, 2017, 1 page.

*Primary Examiner* — Alex Torres-Rivera
(74) *Attorney, Agent, or Firm* — Oblon, McClelland, Maier & Neustadt, L.L.P.

(57) ABSTRACT

A power conversion system that has two power conversion apparatuses each including a converter that can control a DC voltage and an inverter and that drives the AC motor by connecting the outputs of the two inverters in parallel is provided. The output voltage of one of the converters is controlled according to the difference between the detection currents detected by the two current detectors for detecting the output currents of the two inverters so that a cross current flowing through the two inverters is suppressed.

12 Claims, 5 Drawing Sheets

(51) Int. Cl.
*H02P 27/08* (2006.01)
*H02M 1/00* (2006.01)

(56) References Cited

U.S. PATENT DOCUMENTS

| | | | |
|---|---|---|---|
| 2015/0002066 A1* | 1/2015 | Oda | H02M 7/487 |
| | | | 318/500 |
| 2015/0207362 A1* | 7/2015 | Ohnishi | H02J 9/062 |
| | | | 307/65 |
| 2016/0308459 A1* | 10/2016 | Fujii | H02M 1/12 |
| 2017/0012549 A1 | 1/2017 | Abe et al. | |

* cited by examiner

SUPRESSION OF CROSS CURRENT IN A PLURAL CONVERTER SYSTEM

CROSS-REFERENCE TO RELATED APPLICATION

This application is based upon and claims the benefit of priority from the prior PCT Patent Application No. PCT/JP2017/41104, filed on Nov. 15, 2017, the entire contents of which are incorporated herein by reference.

TECHNICAL FIELD

The present invention relates to a power conversion system including at least two power conversion apparatuses whose outputs are connected in parallel.

BACKGROUND ART

As a means for increasing the capacity of a power conversion apparatus, a method of connecting outputs of a plurality of power conversion apparatuses in parallel is known. For example, in a power conversion system in which an AC motor is driven by two power conversion apparatuses, AC outputs of the two power conversion apparatuses are connected via a coupling reactor. In such a parallel multiplexed power conversion system, an output current of each apparatus becomes unbalanced due to the difference in output voltages of the two power conversion apparatuses and the difference in impedance of the coupling reactor and wiring cable. Then, a circulating current called cross flow is generated between two apparatuses. The following method is known as a countermeasure for suppressing this cross current. First, a cross current between two PWM inverters of the power conversion apparatus is detected. Then, a cross current compensation value in the same unit as the common voltage command value of each PWM inverter is obtained. A cross current control unit is provided that adds the cross current compensation value to the voltage command value of one PWM inverter according to the value of the cross current, and subtracts it from the voltage command value of the other PWM inverter. (For example, see Patent Document 1).

PRIOR ART DOCUMENT

Patent Document

Patent document 1: Japanese Patent Publication No. 2012-244674 (page 9, FIG. 1 and FIG. 3)

SUMMARY OF THE INVENTION

Problem to be Solved by the Invention

The cross current control unit disclosed in Patent Document 1 basically controls the output voltage of the PWM inverter that controls the output of the power conversion apparatus as the manipulated variable. In such control, when the cross current to be controlled is large to some extent, the output waveforms of the two inverters are different, and an unexpected harmonic current may flow through the coupling reactor. Therefore, it is necessary to determine the specification of the coupling reactor in consideration of such a phenomenon.

The present invention has been made in view of the above problem, and an object of the present invention is to provide a power conversion system that prevents an unexpected harmonic current from flowing in a cross current control of two power conversion apparatuses that are operated in parallel.

Means for Solving the Problem

In order to achieve the above object, a power conversion system according to the present invention comprises a a first power conversion apparatus including a first converter capable of controlling a DC voltage and a first inverter, and a second power conversion apparatus including a second converter capable of controlling a DC voltage and a second inverter, wherein, an output of the first inverter and an output of the second inverter are connected in parallel via a coupling reactor, and a DC output voltage of any one of these two converters is controlled in accordance with a difference between a first detection current detected by a first current detector detecting an output current of the first inverter and a second detection current detected by a second current detector detecting an output current of the second inverter to suppress a cross current flowing between the first inverter and the second inverter.

Effects of the Invention

According to the present invention, it is possible to provide a power conversion system that prevents an unexpected harmonic current from flowing in the cross current control of two power conversion apparatuses that are operated in parallel.

EMBODIMENT TO PRACTICE THE INVENTION

Hereinafter, embodiment of the present invention will be described with reference to the drawings.

Embodiment 1

Figure 1:
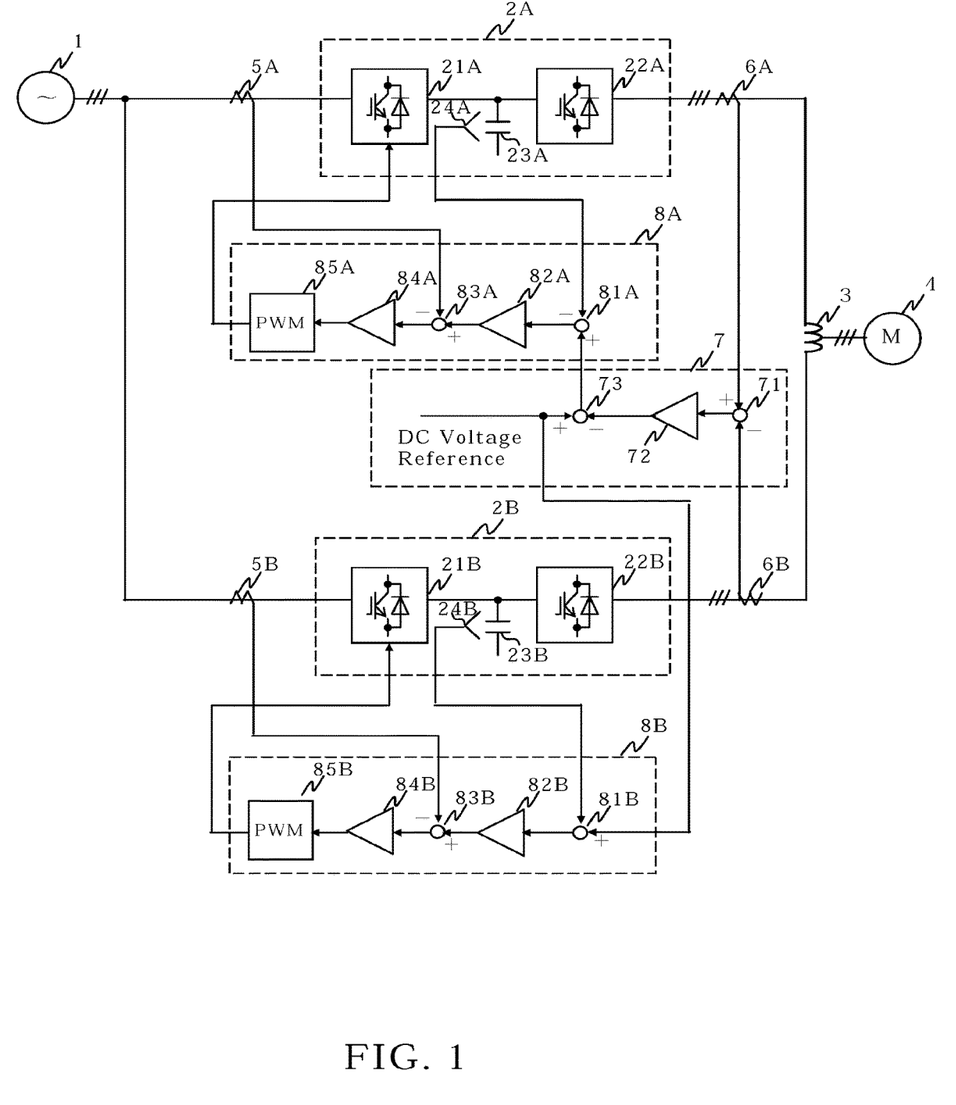
FIG. 1 is a circuit configuration diagram of a power conversion system according to a first embodiment of the present invention.

FIG. 1 is the circuit configuration diagram of the power conversion system according to the first embodiment of the present invention. A commercial three-phase AC power supply 1 is connected to converters 21A and 21B of power conversion apparatuses 2A and 2B via current detectors 5A and 5B, respectively. The power conversion apparatuses 2A and 2B include converters 21A and 21B, DC capacitors 23A and 23B, and inverters 22A and 22B, respectively. DC output voltages of converters 21A and 21B are smoothed by DC capacitors 23A and 23B, and they are inputted to inverters 22A and 22B, respectively. The AC outputs of the inverters 22A and 22B are connected to one and the other terminals of the coupling reactor 3 provided between each phase of the AC output via current detectors 6A and 6B, respectively. The three-phase output at the middle point of the coupling reactor 3 is connected to the AC motor 4. With the above configuration, power conversion apparatuses 2A and 2B drive AC motor 4 in parallel. Here, the inverter 22A and the inverter 22B are synchronously controlled, and their fundamental wave outputs are in same phase.

In this embodiment, the converters 21A and 21B and the inverters 22A and 22B are all voltage-type PWM converters. The power devices constituting the converters 21A and 21B are on/off controlled by gate signals provided from the control units 8A and 8B, respectively. The control units 8A and 8B are supplied with outputs of voltage detectors 24A and 24B for detecting a DC voltage applied to the DC capacitors 23A and 23B, in addition to input current signals from current detectors 5A and 5B, respectively.

The output currents detected by the current detectors 6A and 6B are given to an addition input and a subtraction input of a subtractor 71 of a difference current control unit 7, respectively. Then, the output of the subtractor 71, that is, the difference between the output currents of the inverters 22A and 22B is provided to a difference current controller 72 which is, for example, a PI controller. The difference current controller 72 controls the inputted difference to be a minimum, and supplies the output to the subtraction input of a subtractor 73 as a DC voltage reference correction amount. A preset DC voltage reference is applied to the addition input of the subtractor 73. Then, the output of the subtractor 73 is provided to the control unit 8A as a corrected DC voltage reference.

Further, the DC voltage reference itself is given to the control unit 8B. Here, for example, when the output current of the inverter 22A is smaller than that of the inverter 22B, the output of the difference current controller 72 becomes negative, and therefore, the corrected DC voltage reference which is the output of the subtractor 73 is larger than the DC voltage reference. By this operation, the output voltage and the output current of the inverter 22A increase, and as a result, the difference approaches to be zero.

The internal configuration of the control unit 8A will be described below. The DC voltage of the power conversion apparatus 2A detected by the voltage detector 24A is compared with the corrected DC voltage reference given from the subtractor 73 of the difference current control unit 7 by a subtractor 81A as DC voltage feedback. And the output difference of the subtractor 81A is supplied to a voltage controller 82A, that is, for example a PI controller. The voltage controller 82A controls so that the difference is minimized, and outputs an input current reference. This input current reference is compared with the input current detected by the current detector 5A in the subtracter 83A, and the output difference of a subtracter 83A is given to a current controller 84A, that is, for example a PI controller. The current controller 84A operates as a minor loop controller, controls so that this difference is minimized, and outputs a three-phase voltage command. The three-phase voltage command are given to a PWM controller 85A. The PWM controller 85A supplies a pulse width modulated gate signal to each power device of the converter 21A so that the input voltage of each phase of the converter 21A becomes the three-phase voltage command.

Next, regarding the internal configuration of the control unit 8B, since the internal configuration is the same as that of the control unit 8A, except that the signal supplied to the addition input of a subtractor 81B is not the corrected DC voltage reference but the set DC voltage reference itself, explanation of the control unit 8B is omitted.

Figure 2A:
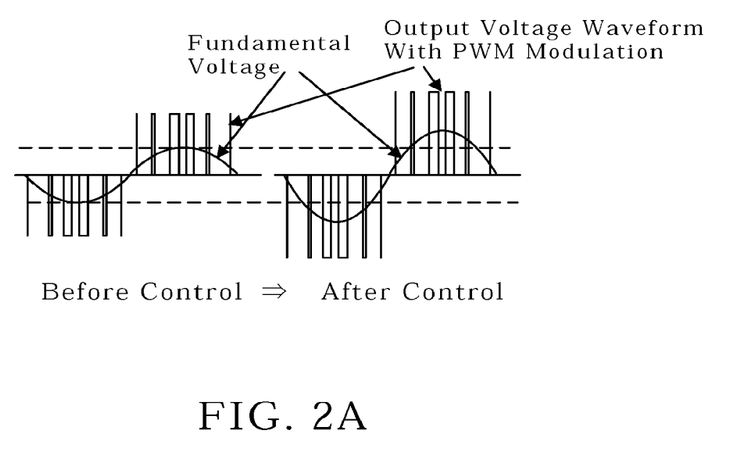
FIGS. 2A and 2B are explanatory diagram of cross flow control according to the first embodiment of the present invention.
Figure 2B:
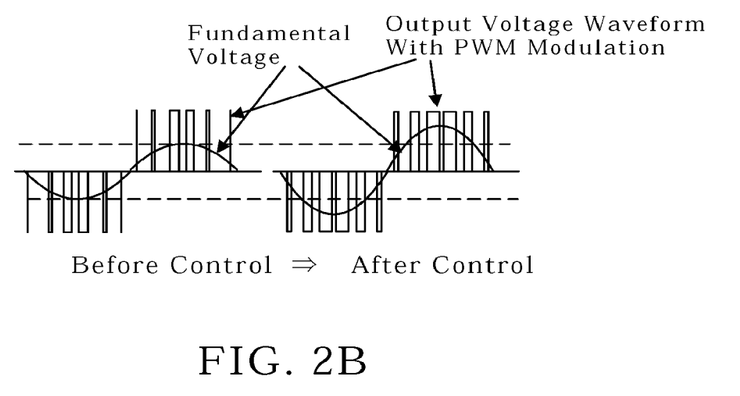

With reference to FIGS. 2A and 2B, how the output voltage waveform of the inverter 22A changes by the operation of the difference current control unit 7 and the control unit 8A with the above configuration will be described. FIG. 2A shows the output voltage waveform of the inverter 22A before and after performing the cross current suppression control by the difference current control unit 7 in the first embodiment. This control is an example of control when the output current of the inverter 22A is small. Since the control for increasing the DC voltage is performed as shown in the figure, the pulse width of the PWM-modulated output voltage waveform is the same before and after the control. Although the peak value of the fundamental wave voltage has increased after the control as compared to before the control, unexpected harmonic components are not included.

FIG. 2B shows the transition of the output voltage waveform of the inverter 22A when the same cross current control is performed by modulating the PWM pulse of the inverter 22A. As shown in the figure, in this case, the peak value of the output voltage waveform PWM-modulated by the cross current suppression control does not change, but the pulse width of the output voltage waveform changes significantly, and the frequency components of the harmonics also differ greatly before and after control. Therefore, in this case, an unexpected harmonic current may flow through the coupling reactor 3.

The power conversion apparatus 2A is an example of a "first power conversion apparatus", and the power conversion apparatus 2B is an example of a "second power conversion apparatus". Converter 21A is an example of a "first converter", and converter 21B is an example of a "second converter". Further, inverter 22A is an example of a "first inverter", and converter 22B is an example of a "second inverter". The current detector 6A is an example of a "first current detector", and the current converter 6B is an example of a "second current detector". The control unit 8A is an example of a "first control unit", and the control unit 8B is an example of a "second control unit".

Embodiment 2

Figure 3:
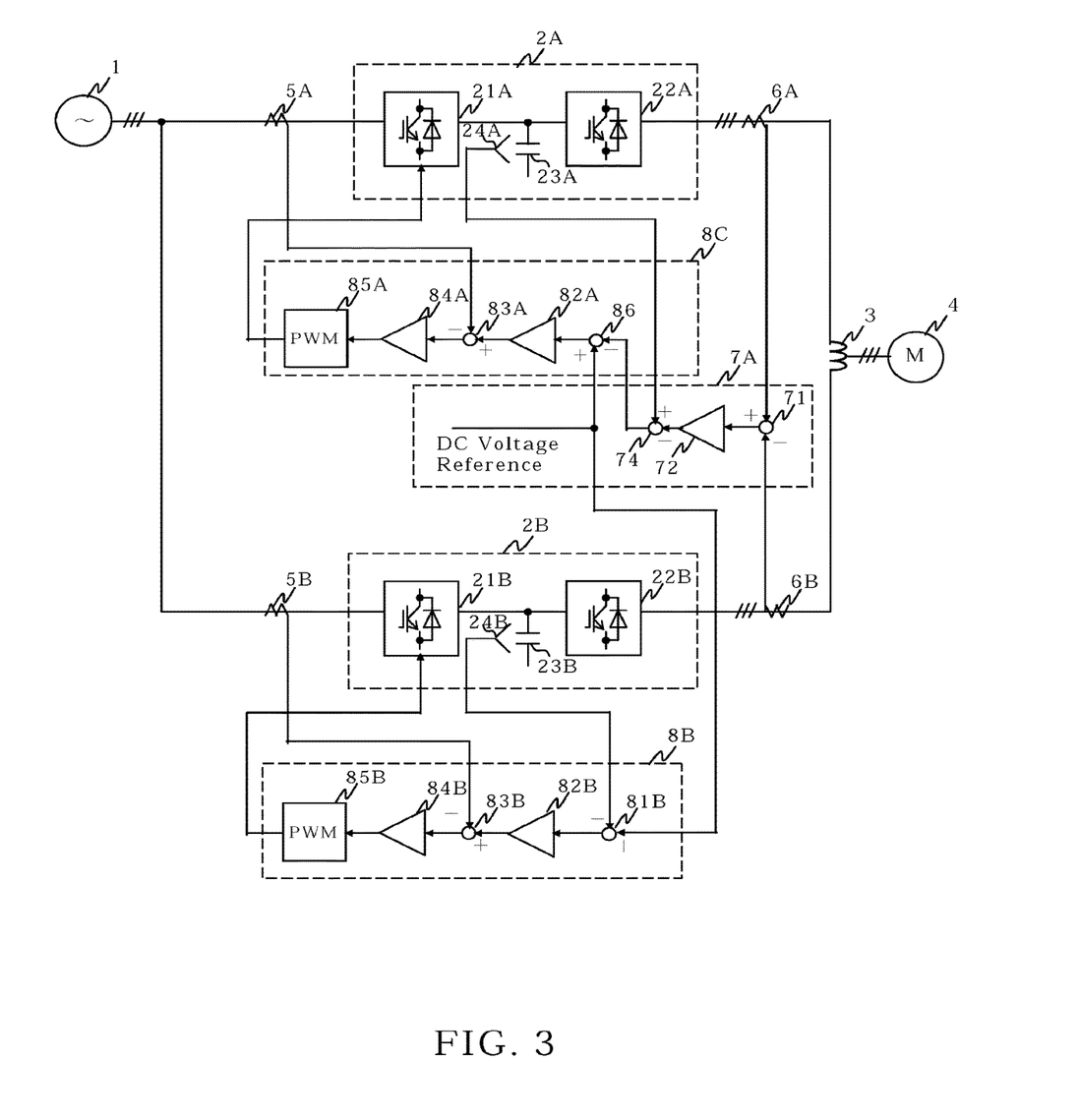
FIG. 3 is a circuit configuration diagram of a power conversion system according to a second embodiment of the present invention.

FIG. 3 is the circuit configuration diagram of the power conversion system according to the second embodiment of the present invention. Regarding each part of the second embodiment, the same parts as those of the power conversion system according to the first embodiment of the present invention in FIG. 1 are denoted by the same reference numerals, and description thereof will be omitted. The difference between the second embodiment and the first embodiment is followings. First, in the difference current control unit 7A, the subtractor 74 calculate the difference between the DC voltage feedback correction amount outputted from the difference current controller 72 and the DC voltage detected by the voltage detector 24A, and gives the output as corrected DC voltage feedback to the subtraction input of a subtractor 86 of the control unit 8C. Second, DC voltage reference is given to the addition input of the subtractor 86, and the difference between the DC voltage reference and the output of the subtractor 74 is provided to the voltage controller 82A.

In the first embodiment, the DC voltage reference is corrected by the subtractor 73, and the corrected DC voltage reference is provided to the subtractor 81A. In contrast, in the second embodiment, as described above, the DC voltage feedback is corrected by the subtractor 74 without changing the DC voltage reference, and the corrected DC voltage feedback is provided to the subtractor 86. That is, the first and second embodiments differ only in that the DC voltage reference or the DC voltage feedback is corrected for the cross current suppression control, so the basic operation and effect are the same.

Embodiment 3

Figure 4:
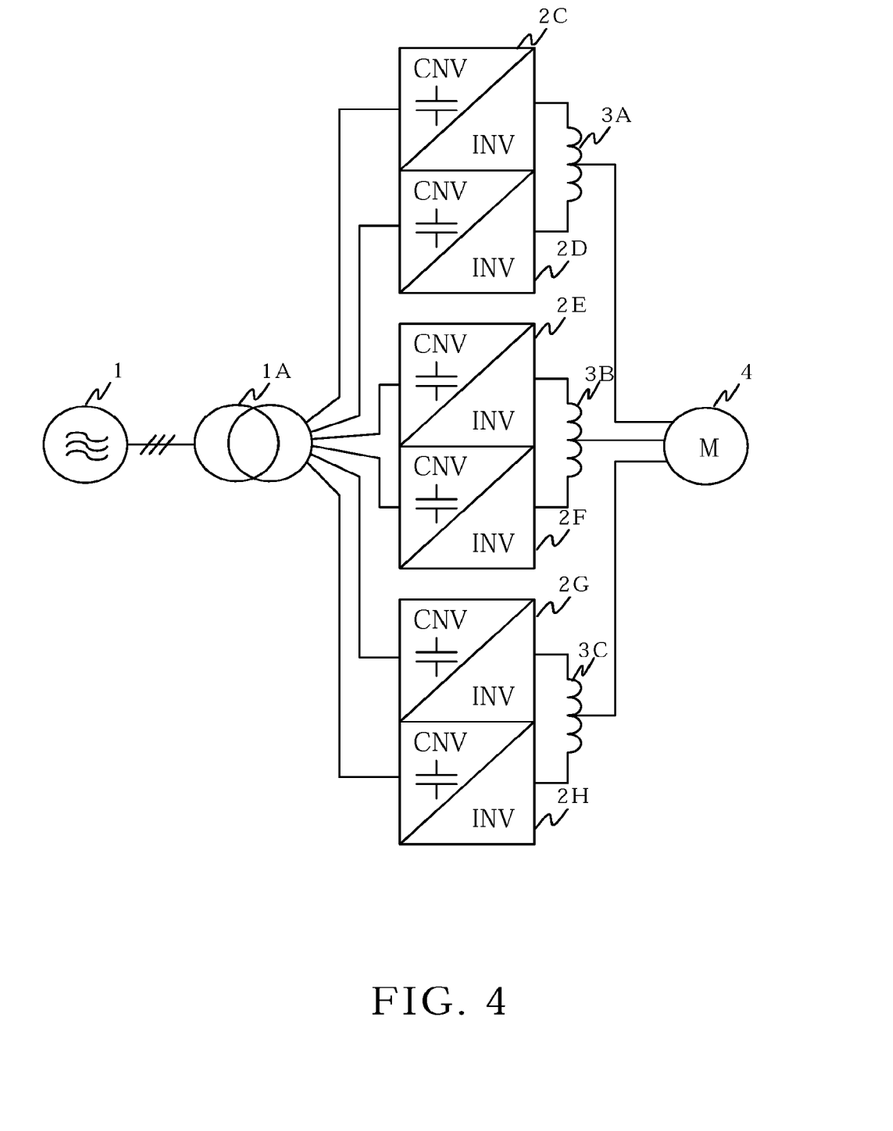
FIG. 4 is a block diagram of a power conversion system according to a third embodiment of the present invention.

FIG. 4 is the block diagram of a power conversion system according to Embodiment 3 of the present invention. The AC power supply 1 supplies an AC voltage to the primary winding of an input transformer 1A. The input transformer 1A is a secondary multi-winding transformer, and has six secondary windings in this embodiment. From each of these secondary windings, a three-phase or single-phase secondary voltage is supplied to each converter of the power conversion apparatuses 2C, 2D, 2E, 2F, 2G, and 2H. Each inverter of the power conversion apparatuses 2C, 2D, 2E, 2F, 2G, and 2H is a single-phase inverter. Inverter output of the power conversion apparatuses 2C and 2D, 2E and 2F, and 2G and 2H are connected in parallel via the coupling reactors 3A, 3B and 3C, respectively. The midpoint of each of the coupling reactors 3A, 3B, and 3C is connected to the U-phase, V-phase, and W-phase input terminals of the AC motor 4, respectively.

Even in the power conversion system having the configuration shown in FIG. 4, it is possible to apply the cross current suppression control described in the first or second embodiment. That is, the DC voltage reference or the DC voltage feedback of one power conversion apparatus is corrected according to the difference between the output currents of the inverters forming a pair, and the converter of one power conversion apparatus is controlled so that this difference is minimized.

Embodiment 4

Figure 5:
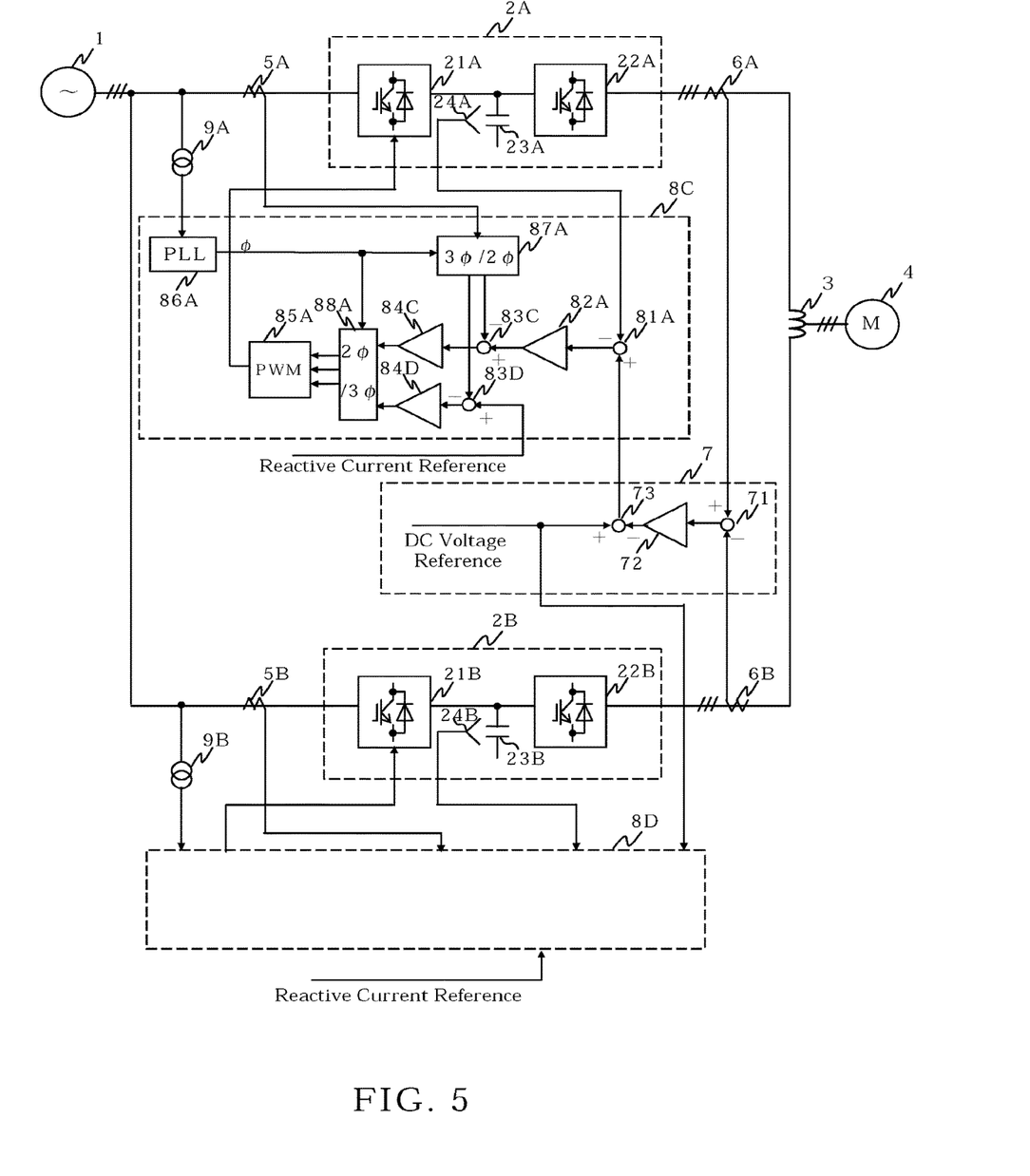
FIG. 5 is a circuit configuration diagram of a power conversion system according to a fourth embodiment of the present invention.

FIG. 5 is the circuit configuration diagram of a power conversion system according to Embodiment 4 of the present invention. Regarding each part of the fourth embodiment, the same parts as those of the power conversion system according to the first embodiment of the present invention in FIG. 1 are denoted by the same reference numerals, and description thereof will be omitted. The fourth embodiment differs from the first embodiment in that, the control unit 8C that controls the converter 21A performs the reactive power control. For this purpose, a voltage detector 9A for detecting the input voltage of the converter 21A is provided, and its output is provided to a phase synchronization circuit 86A in the control unit 8C.

Hereinafter, the internal configuration of the control unit 8C will be described. The three-phase current detected by the current detector 5A is inputted to a 3-phase to 2-phase converter 87A. The 3-phase to 2-phase converter 87A converts the three-phase current into a q-axis current and a d-axis current orthogonal thereto based on a reference phase p outputted from a phase synchronization circuit 86A. If the reference phase p is appropriately selected, the q-axis current can be an active current flowing into the converter 21A, and the d-axis current can be a reactive current. A subtractor 83C calculates the difference between the active current reference outputted from the voltage controller 82A and the q-axis current, and provides the difference to a q-axis current controller 84C. The q-axis current controller 84C operates as a minor loop controller, outputs a q-axis voltage command by controlling the input difference to be a minimum, and supplies the q-axis voltage command to a 2-phase to 3-phase converter 88A.

On the other hand, the d-axis current is supplied to a subtractor 83D, and the difference between the reactive current reference given from the outside and the d-axis current is calculated in the subtractor 83D, and the difference is supplied to a d-axis current controller 84D. The d-axis current controller 84D outputs a d-axis voltage command by controlling the input difference to be a minimum, and supplies the d-axis voltage command to the 2-phase to 3-phase converter 88A. The 2-phase to 3-phase converter 88A converts the q-axis voltage command and the d-axis voltage command into three-phase voltage commands based on the reference phase φ, and supplies the three-phase voltage commands to the PWM controller 85A.

Further, in FIG. 5, the control unit 8D that controls the converter 21B also performs the reactive power control, and thus provides the signal of a voltage detector 9B to a control unit 8D. Since the internal configuration of the control unit 8D is the same as the internal configuration of the control unit 8C except that the DC voltage reference is not the corrected DC voltage reference but the set DC voltage reference itself, the description is omitted.

According to the configuration described above, by applying the reactive power control to the converter 21A, the DC voltage constant control and the inverter-side cross current suppression control are performed by the active current control, and, for example, it becomes possible to control the reactive power to the power system to be desired value by the reactive current control.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in each embodiment, the converter 21 is a self-excited converter using a so-called self-extinguishing element. However, in the case of a converter that does not control reactive power, a external commutated converter can be used as long as the DC output can be variably controlled.

In the third embodiment, an example of the power conversion system including a plurality of sets of two single-phase output power conversion apparatuses has been described. However, obviously the present application also applies a normal three-phase output power conversion apparatus. For example, two sets of two power conversion apparatuses shown in FIG. 1 may be used, and the outputs of each set may drive an AC motor via a coupling reactor.

Also, in the fourth embodiment, it is described that both the converters of the two power conversion apparatuses perform the reactive power control. However, the configuration may be such that only one of the converters performs the reactive power control.

EXPLANATION OF SYMBOLS

1 AC power supply
1A Input transformer 2A, 2B, 2C, 2D, 2E, 2F, 2G, 2H Power conversion apparatus
21A, 21B Converter
22A, 22B Inverter
23A, 23B DC capacitor
24A, 24B Voltage detector
3, 3A, 3B, 3C Coupling reactor
4 AC motor
5A, 5B Current detector
6A, 6B Current detector
7, 7A Difference current control unit
71 Subtractor
72 Difference current controller
73, 74 Subtractor
8A, 8B, 8C, 8D Control unit
81A, 81B Subtractor
82A, 82B Voltage controller
83A, 83B, 83C, 83D Subtractor
84A, 84B, 84C, 84D Current controller
85A, 85B @ PWM controller
86A Phase synchronization circuit
87A 3-phase to 2-phase converter
88A 2-phase to 3-phase converter
9A, 9B Voltage detector

The invention claimed is:

1. A power conversion system for driving an AC motor, comprising:
a first power conversion apparatus including a first converter configured to control a DC voltage and a first inverter;
a second power conversion apparatus including a second converter configured to control a DC voltage and a second inverter, wherein
outputs of the first inverter and the second inverter are connected in parallel via a coupling reactor, and
a DC output voltage of any one of the first converter and the second converter is controlled in accordance with a difference between a first detection current detected by a first current detector detecting an output current of the first inverter and a second detection current detected by a second current detector detecting an output current of the second inverter to suppress a cross current flowing between the first inverter and the second inverter.

2. The power conversion system according to claim 1, further comprising:
a first controller that is configured to control the first converter;
a second controller that is configured to control the second converter;
a difference current control unit that is configured to output a correction signal to the first controller so that a difference between the first detection current and the second detection current is minimized, wherein
the second controller is configured to control the DC output voltage of the second converter to be a predetermined DC voltage reference, and
the first controller is configured to control the DC output voltage of the first converter to a value obtained by correcting the predetermined DC voltage reference with the correction signal.

3. The power conversion system according to claim 1, further comprising:
a first controller that is configured to control the first converter;
a second controller that is configured to control the second converter;
a difference current control unit that is configured to output a correction signal to the first controller so that a difference between the first detection current and the second detection current is minimized, wherein
the second controller is configured to control the DC output voltage of the second converter to be a predetermined DC voltage reference, and
the first controller configured to control a DC feedback voltage of the first converter with the correction signal so that a value corrected by the correction signal becomes the predetermined DC voltage reference.

4. The power conversion system according to claim 1, wherein
at least one of a first controller that is configured to control the first converter and a second controller that is configured to control the second converter is configured to perform reactive current control, and
an AC output voltage control of the first converter or the second converter is performed using the reactive current control of the first converter or the second converter as a minor loop.

5. The power conversion system according to claim 2, wherein
at least one of the first controller and the second controller is configured to perform reactive current control, and
an AC output voltage control of the first converter or the second converter is performed using the reactive current control of the first converter or the second converter as a minor loop.

6. The power conversion system according to claim 3, wherein
at least one of the first controller and the second controller is configured to perform reactive current control, and
an AC output voltage control of the first converter or the second converter is performed using the reactive current control of the first converter or the second converter as a minor loop.

7. The power conversion system according to claim 1, wherein
a plurality of sets of the two power conversion apparatuses are provided, and
outputs of the plurality of sets of the inverters are combined to drive the AC motor.

8. The power conversion system according to claim 2, wherein
a plurality of sets of the two power conversion apparatuses are provided, and
outputs of the plurality of sets of the inverters are combined to drive the AC motor.

9. The power conversion system according to claim 3, wherein
a plurality of sets of the two power conversion apparatuses are provided, and
outputs of the plurality of sets of the inverters are combined to drive the AC motor.

10. The power conversion system according to claim 4, wherein
a plurality of sets of the two power conversion apparatuses are provided, and
outputs of the plurality of sets of the inverters are combined to drive the AC motor.

11. The power conversion system according to claim 5, wherein
a plurality of sets of the two power conversion apparatuses are provided, and
outputs of the plurality of sets of the inverters are combined to drive the AC motor.

12. The power conversion system according to claim 6, wherein
a plurality of sets of the two power conversion apparatuses are provided, and
outputs of the plurality of sets of the inverters are combined to drive the AC motor.

\* \* \* \* \*